US007519365B2

(12) United States Patent
Dorsey et al.

(10) Patent No.: US 7,519,365 B2
(45) Date of Patent: *Apr. 14, 2009

(54) METHOD FOR A RADIO TELEPHONE TO SEARCH FOR HIGHER PRIORITY NETWORKS

(75) Inventors: Donald A. Dorsey, Vernon Hills, IL (US); Sharada Raghuram, Buffalo Grove, IL (US); Charles P. Binzel, Bristol, WI (US)

(73) Assignee: Motorola, Inc, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/742,699

(22) Filed: May 1, 2007

(65) Prior Publication Data

US 2007/0202875 A1    Aug. 30, 2007

Related U.S. Application Data

(63) Continuation of application No. 10/431,617, filed on May 7, 2003, now abandoned.

(51) Int. Cl.
*H04Q 7/20* (2006.01)
(52) U.S. Cl. .................. 455/435.1; 455/435.3; 455/434; 455/432.1; 455/515; 455/422.1
(58) Field of Classification Search ... 455/432.1–432.3, 455/435.1–435.3, 434, 440, 447, 444, 509, 455/512, 515, 517, 558, 422.1; 370/331–332, 370/328, 338
See application file for complete search history.

(56) References Cited

U.S. PATENT DOCUMENTS

| 5,586,338 | A |   | 12/1996 | Lynch et al. |
| 5,903,832 | A | * | 5/1999  | Seppanen et al. ........ 455/435.3 |
| 5,950,130 | A |   | 9/1999  | Coursey |
| 5,974,328 | A |   | 10/1999 | Lee et al. |
| 5,983,115 | A |   | 11/1999 | Mizikovsky |
| 6,085,085 | A |   | 7/2000  | Blakeney et al. |
| 6,085,110 | A |   | 7/2000  | Nilsson |
| 6,148,197 | A |   | 11/2000 | Bridges et al. |

(Continued)

OTHER PUBLICATIONS

"3rd Generation Partnership Project; Technical Specification Group Radio Access Network; Radio Resource Control (RRC); Protocol Specification" 3GPP TS 25.331; v3.12.0; Sep. 2002.

(Continued)

*Primary Examiner*—Kamran Afshar
(74) *Attorney, Agent, or Firm*—Sylvia Chen

(57) ABSTRACT

A method for a radiotelephone to search for a high priority, home, or home-equivalent public land mobile network (PLMN) includes a first step of registering and camping (300) the radiotelephone on a cell of visited PLMN. A next step includes uniquely identifying (302) the cell. A next step includes searching (304) for PLMNs with a higher priority than the visited PLMN while registered and camped on the uniquely identified cell. A next step includes storing (306) a history of those frequencies found that are not of a higher priority PLMN for the uniquely identified cell. Any subsequent searches for frequencies of higher priority PLMNs performed while registered and camped on that cell includes scanning (308) for available frequencies except for those frequencies listed in the history for the uniquely identified cell in which the radiotelephone is registered and camped.

17 Claims, 2 Drawing Sheets

U.S. PATENT DOCUMENTS

| | | | |
|---|---|---|---|
| 6,192,224 B1 | 2/2001 | Grayson et al. | |
| 6,223,042 B1 | 4/2001 | Raffel | |
| 6,259,917 B1 | 7/2001 | Elzein | |
| 6,298,235 B1 | 10/2001 | Bamburak et al. | |
| 6,311,064 B1 | 10/2001 | Bamburak et al. | |
| 6,374,106 B2 | 4/2002 | Konno et al. | |
| 6,415,148 B1 | 7/2002 | Chiniga et al. | |
| 6,463,286 B1* | 10/2002 | Salminen | 455/453 |
| 6,466,802 B1 | 10/2002 | Blakeney, II et al. | |
| 6,487,399 B1 | 11/2002 | Rajaniemi et al. | |
| 6,625,451 B1 | 9/2003 | La Medica, Jr. et al. | |
| 6,754,491 B2 | 6/2004 | Konno et al. | |
| 6,829,481 B2* | 12/2004 | Souissi | 455/436 |
| 6,954,649 B2* | 10/2005 | Kotzin | 455/456.1 |
| 6,961,569 B2* | 11/2005 | Raghuram et al. | 455/435.1 |
| 6,992,993 B1* | 1/2006 | Park et al. | 370/328 |
| 7,062,271 B2* | 6/2006 | Choi | 455/434 |
| 7,184,768 B2* | 2/2007 | Hind et al. | 455/435.3 |
| 7,231,213 B2* | 6/2007 | Dorsey et al. | 455/445 |
| 7,333,795 B2* | 2/2008 | Dorsey et al. | 455/435.1 |
| 2004/0058679 A1* | 3/2004 | Dillinger et al. | 455/439 |
| 2006/0234705 A1* | 10/2006 | Oommen | 455/435.3 |

OTHER PUBLICATIONS

"3rd Generation Partnership project; Technical Specification Group Core Network; NAS Functions related to Mobile Station (MS) in idle mode" 3GPP TS 23.122; v5.2.0; Dec. 2002.

* cited by examiner

METHOD FOR A RADIO TELEPHONE TO SEARCH FOR HIGHER PRIORITY NETWORKS

CROSS-REFERENCE TO RELATED APPLICATION

This application is a continuation of U.S. application Ser. No. 10/431,617 filed on May 7, 2003, which is entitled "A Method for a Radiotelephone to Search for Higher Priority Networks," is assigned to the assignee of the present application, and is incorporated herein by this reference, and claims priority upon such application under 35 U.S.C. § 120.

FIELD OF THE INVENTION

The present invention relates in general to radiotelephone communication systems, and more particularly to a method for a radiotelephone to scan for alternate radiotelephone access communication systems.

BACKGROUND OF THE INVENTION

As various different types of communication systems have arisen for radiotelephones, it has become beneficial to provide portable and mobile radiotelephone stations that are interoperable between these various communication systems. As a first step, dual-mode phones have been developed that can operate between two radiotelephone systems. For example, the Global System for Mobile (GSM) communication system and the Wideband Code Division Multiple Access (WCDMA) communication system are intended to work together in the same mobile terminal equipment operated under a Universal Mobile Telecommunications System (UMTS) environment, wherein a mobile radiotelephone is required to scan for these two alternate radio access technologies (RAT) and all possible operating frequencies for each. In particular, a UMTS radiotelephone is required to scan for these radio access technologies and frequencies when looking for its home Public Land Mobile Network (PLMN), to determine the availability of its home PLMN (HPLMN). In particular, the 3GPP specifications allow for a mobile station to perform (background) scans for PLMNs other than the one on which it has currently obtained service.

Currently, GSM and UMTS cellular radiotelephones are required to perform a periodic search for their home PLMN and higher priority PLMNs whenever the radiotelephone is camped on a Visited PLMN (VPLMN) and in its home country. When outside their home country, the mobile stations are required to perform a search for higher priority PLMNs, but not their home PLMN. This search is required to be performed periodically at a rate which is specified on the Subscriber Identity Module (SIM) or Universal SIM card and is a multiple of six minutes (with the fastest rate being once every six minutes). This search consumes battery power to perform because the radiotelephone must measure power on all frequencies of all bands which it supports and then sync to each frequency on which there is appreciable energy and read the PLMN identification of the cell. Note that for UMTS radiotelephones which support both GSM and WCDMA Radio Access Technologies (RATs), the radiotelephone is currently required by 3GPP specifications to perform the search in both RATs (i.e. the phone must perform the search for the HPLMN in all radio access technologies of which it is capable). This is true even if the HPLMN network has cells of only one RAT. Therefore, the requirement to search for all possible RATs and all possible frequencies wastes significant battery power and is unnecessary.

Further, when camped on a particular Visited PLMN (VPLMN) cell and searching for the HPLMN or higher priority PLMNs, mobile stations can now see energy on (and synchronize to and read the PLMN identification of) the same frequencies over and over again, each time the mobile unit does another search. This occurs even though these frequencies were already found in previous searches to not be the home PLMN or higher priority PLMNs.

Therefore, the need exists for a method to allow a mobile unit to search for the home PLMN and higher priority PLMNs in only those radio access technologies and frequencies that have not already been discounted (i.e. determined to be not of the HPLMN or higher priority PLMNs) during previous scans performed in the same geographic area. It would also be of benefit to provide this performance improvement with little or no additional cost.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

The present invention provides a method to allow a mobile unit to search for the home PLMN and higher priority PLMNs in only those radio access technologies and frequencies of higher priority networks that have not already been discounted (i.e. determined to be not of the HPLMN or higher priority PLMNs) during previous scans performed in the same geographic area. This saves time and battery power in the mobile unit. Additionally, the present invention can be implemented in a communication system with a relatively simple software modification and no additional hardware, therefore limiting any cost penalty.

Allowing for higher priority network scanning in accordance with the present invention provides several advantages. These advantages include, but are not limited to, the following examples. The mobile unit can scan for available higher priority service within another technology. Scanning can reduce roaming charges when a home or higher priority network is available. The mobile unit can reduce the number of required scans to obtain service on its home or higher priority network, thereby saving battery drain. In addition, the home or higher priority networks can provide more efficient services that can be used beneficially by the mobile unit.

Figure 1:
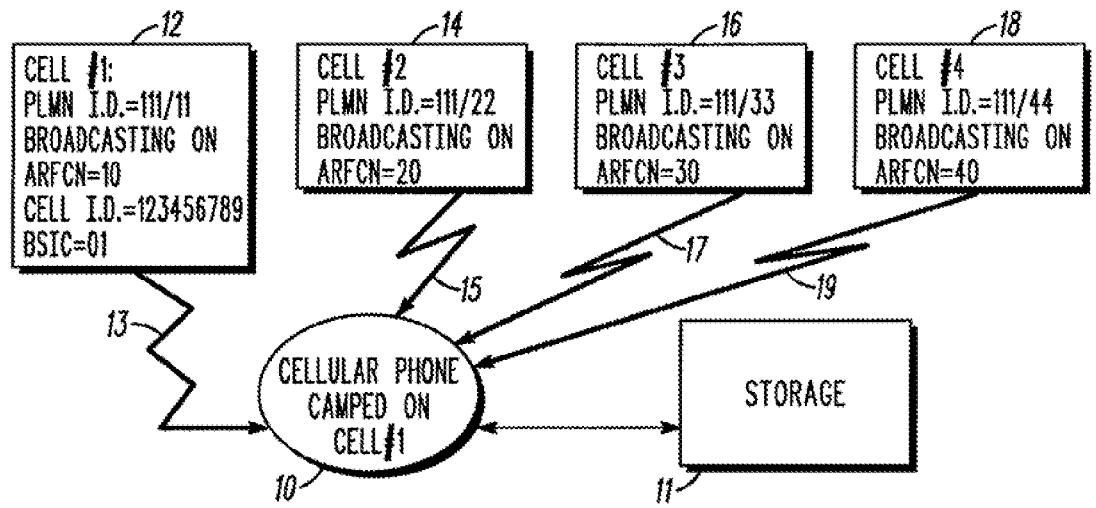
FIG. 1 illustrates a simplified block diagram of a mobile unit and a network, in accordance with the present invention
Figure 2:
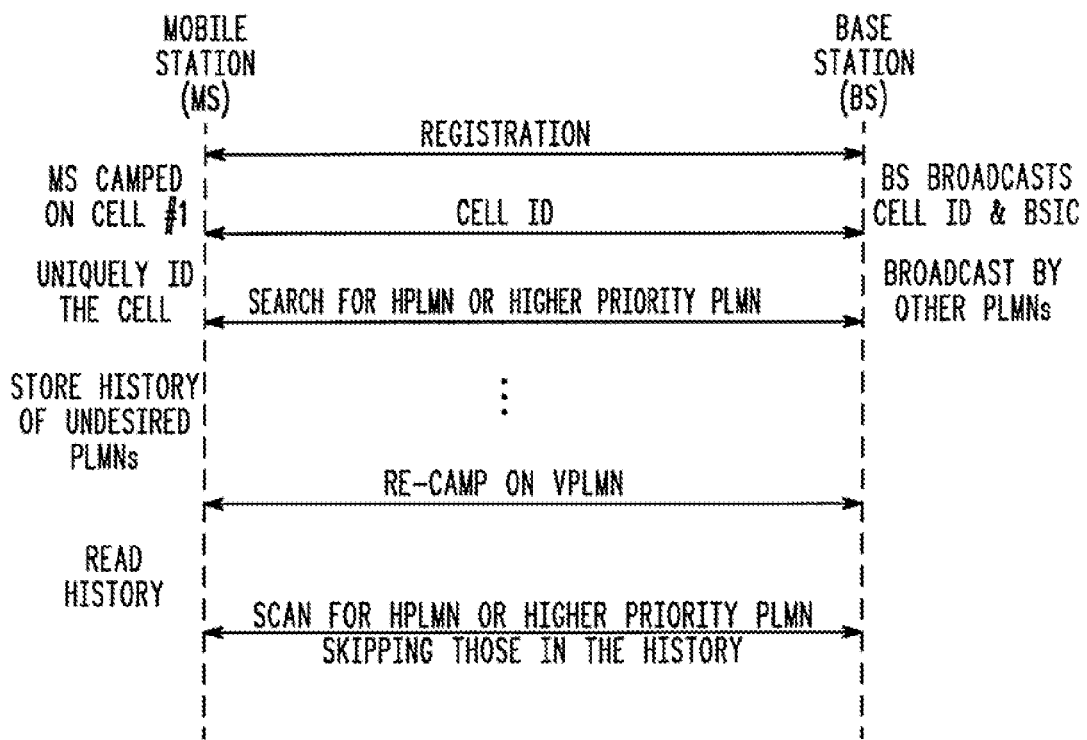
FIG. 2 illustrates the interaction between a mobile unit and a network, in accordance with the present invention.

FIGS. 1 and 2 show mobile radiotelephone operation, in accordance with the present invention. In general, communication networks have a plurality of cells for providing radiotelephone service to a radiotelephone within a corresponding geographic area. Different networks may have overlapping cell coverage within a geographic area. Each cell of a network provides a radio communication coverage area established by fixed site base stations. Each base station is operable to send and receive messages with mobile radiotelephones. As the radiotelephones are mobile, they are required to search for home radio access technology communication networks as they roam between cells and/or communication systems. Communication systems, such as GSM, operate on frequency bands with radio channels identified by Absolute Radio Frequency Channel Number (ARFCN). For example, in the GSM 900 MHz band ARFCN 1 to 124 are used. Correspondingly, the GSM 1800 MHz band uses ARFCN 512 to 885, and GSM 1900 MHz band uses ARFCN 512 to 810. To avoid frequency conflicts, different PLMN operators do not broadcast on the same frequencies in the same geographic areas.

In practice, when the mobile station (MS) 10 is switched on, it attempts to make contact with a Public Land Mobile Network (PLMN), and in particular the last registered PLMN upon which service was provided. The MS chooses a local cell (Cell #1) base station (BS) 12 of the PLMN, and the MS 10 and BS 12 initialize and register communication between themselves whereupon the mobile is camped on the base station's network (e.g. GSM or WCDMA). The MS 10 synchronizes to a control channel 13 of the BS 12 and reads the PLMN ID, ARFCN, an identifier for the cell (CELL ID), and the Base transceiver Station Identity Code (BSIC). Any or all of this information is used to uniquely identify the particular cell that the MS is camped on. The radiotelephone would save this information in storage 11, which can be a Subscriber Identity Module (SIM), Universal SIM (USIM), or a memory, such as a non-volatile memory, for example.

Typically, a MS will be operable on its home PLMN. However, in those cases where the MS is roaming in its home country, it will camp and register on a Visited PLMN (VPLMN) and base station. The VPLMN can consist of one or more different radio access technologies, such as GSM and WCDMA, for example. A list of preferred PLMNs (possibly including the VPLMN) is prestored on a Subscriber Identity Module (SIM) card. These listed PLMNs are assigned priorities by the home network provider of the MS. The highest priority network for the mobile unit is its home Public Land Mobile Network (HPLMN) (or home-equivalent PLMN). However, since the MS is roaming, it may find itself camped on a lower priority VPLMN. Therefore, several other higher priority networks can be available to the MS. The presence of these higher priority networks must be determined through scanning.

When camped on a VPLMN, the mobile station is required under the 3GPP standard to do a search periodically to find access to higher priority networks, and preferably its home PLMN. Specifically, the 3GPP 23.122 specification, version 5.2.0 (2002-12) in section 4.4.3.3 states, "If the MS is in a VPLMN, the MS shall periodically attempt to obtain service on its HPLMN or higher priority PLMN . . . " The present invention is effective in those cases where the VPLMN is not the HPLMN of the mobile unit, inasmuch as the HPLMN is typically of the highest priority and no search would be required if the mobile unit was camped thereon.

Therefore, referring to FIGS. 1 and 2, the MS 10 will search for the home and higher priority PLMNs than the VPLMN upon which the radiotelephone is presently camped. For example, the radiotelephone could monitor the frequencies 15, 17, 19 of any co-located or nearby cells 14, 16, 18 having sufficient signal strength. The radiotelephone can then determine whether any of these cells are of a higher priority PLMN than the camped cell #1.

A novel aspect of the present invention is then having the radiotelephone store a history of those frequencies found, while camped on a particular cell, that are not of a home or higher priority public land mobile network. Similarly, if a history already exists for the particular camped cell, then the radiotelephone adds any newly found frequencies that are not of a higher priority PLMN to any previously found frequencies in the history. The radiotelephone would save the history in storage 11, which can be a SIM, USIM, or a memory, such as a non-volatile memory, for example. The history would be associated with the uniquely identified cell, such that the radiotelephone would no longer need to search for a particular frequency 15, 17, 19 within that uniquely identified cell since it had previously determined that this frequency is only used by an undesired PLMN. Preferably, the radiotelephone stores an individual history of those frequencies found that are not of a home or higher priority public land mobile network for each of a plurality of cells of the VPLMN.

Thereafter, the radiotelephone would scan for frequencies of the home or higher priority public land mobile networks except for those frequencies 15, 17, 19 listed in the history for the uniquely identified cell in which the radiotelephone is camped. This would save considerable searching time and the associated battery drain.

For example, while camped on a cell (#1) of a VPLMN network, the MS performs a search for the home and higher priority PLMNs. The MS saves a record which includes the following information: information (e.g. Cell ID 123456789, ARFCN, BSIC, etc.) to uniquely identify the serving cell at the time of the PLMN search, and the ARFCNs of the frequencies 15, 17, 19 which turned out to be PLMNs which were not the home or higher priority PLMNs (e.g. ARFCN 20, 30 and 40). In the example of FIG. 1, PLMN I.D.s 111/22, 111/33 and 111/44 are all PLMNs which are not the home or higher priority PLMNs. At this point the radiotelephone can proceed with normal communication. However, when the radiotelephone roams and is again camped on the same cell of the VPLMN network (as the MS was on previously when it created the stored history of information), the MS must perform another search for frequencies of the home and higher priority PLMNs. In this case, the MS now uses the saved history to avoid synchronizing to and reading the PLMN I.D. (i.e. skip searching) on frequencies 15, 17, 19 which have already been found to be not the home or higher priority PLMNs. For example, Cell ID 123456789 has a history of undesired frequencies ARFCN 20, 30 and 40. Therefore, in this PLMN search, the MS will not attempt to synchronize to or read the PLMN I.D. on cell #2, #3, or #4 (i.e. PLMN I.D.s 111/22, 111/33 and 111/44), thereby saving time and power.

It may be the case that after a radiotelephone has stored a history of frequencies for non-higher priority PLMNs in a particular cell, then the configuration of cells is physically changed so that the same ARFCN which was not a higher priority PLMN before becomes a higher priority PLMN. In this case, the history stored in the radiotelephone is incorrect. According to the 3GPP standard, those particular frequencies must be scanned. Therefore, the present invention provides that the radiotelephone would only save the records described above only when the radiotelephone is powered (e.g. stored in RAM) such that the history records are reset anew at each power up. In this way, if the radiotelephone ever got trapped in a mode in which it was not finding a higher priority PLMN due to change of the physical cell configuration, the user could power it off and back on again to eliminate the problem. Alternatively, the radiotelephone could have a periodic timeout period (e.g. three hours) wherein the histories are erased and the radiotelephone must rebuild them.

It may also be the case that a user could change the user-controlled PLMN list on the SIM or USIM so that a PLMN that was not a higher priority PLMN before (when a previous search was performed and stored) is now a higher priority PLMN. In this case, the present invention provides that if the user changes the user-controlled PLMN list, then all of the history records of previous PLMN searches are reset (i.e. destroyed). Alternatively, the MS can still save the PLMN identifications (IDs) of those ARFCNs that were found to not be the home or higher priority PLMNs. In this way, if the user-controlled preferred PLMN list is changed, the MS would still be able to make use of the stored information to save current drain. This technique is preferred.

It may also be the case that if the VPLMN network on which the radiotelephone is currently camped supports the Equivalent PLMN feature of the 3GPP standard, then the radiotelephone may be given a list of PLMNs which should be treated as equivalent to the VPLMN. (This list is given to the phone at the time of attach and Routing Area Update.) However, if the equivalent PLMN list which the radiotelephone was using when the original PLMN search was performed is different than the equivalent PLMN list which it is currently using (i.e. a PLMN which was not a higher priority PLMN before when the previous PLMN search was performed could be a higher priority PLMN now), then the present invention provides for three solutions, as follows.

Firstly, the radiotelephone could not save a record of a previous PLMN search if equivalent PLMNs were in use at the time, and the radiotelephone could not use any of the stored history records of previous PLMN searches if equivalent PLMNs are in use now.

Secondly, if equivalent PLMNs were in use when a previous PLMN search was performed, then the radiotelephone could save the equivalent PLMN list that was in use at the time as part of the saved history information for that PLMN search. Afterwards, when performing future PLMN searches, the radiotelephone would only use the saved information to minimize battery consumption if the equivalent PLMN list in use now is the same as that which was in use when the original search (associated with the saved history) was performed. It should be noted that it is very likely that the equivalent lists will in fact be the same.

Thirdly, the radiotelephone could simply save the PLMN IDs associated with each of the ARFCNs which was found to be not the home or higher priority PLMNs. This way, when performing a later search, if one of the PLMN IDs now is a higher priority PLMN, then the radiotelephone would know that is must synchronize to and read the PLMN ID on that cell to re-verify it.

As a failsafe solution, the radiotelephone can always be directed to do a complete search for all available frequencies in use for the home or higher priority PLMNs, and update the history with any new frequencies found that are not of the home or higher priority PLMN. Similarly, the radiotelephone can be required to erase the history for any change in the preferred public land mobile network list.

Advantageously, the present invention provides that by skipping the search in the frequencies which are not employed by the higher priority PLMN operator, the battery drain is greatly reduced. In addition, the radiotelephone will periodically perform the higher priority PLMN search in only those frequencies which can belong to higher priority PLMNs, and can update the stored history with those new frequencies that have been found not to be employed by the higher priority PLMN operator.

Figure 3:
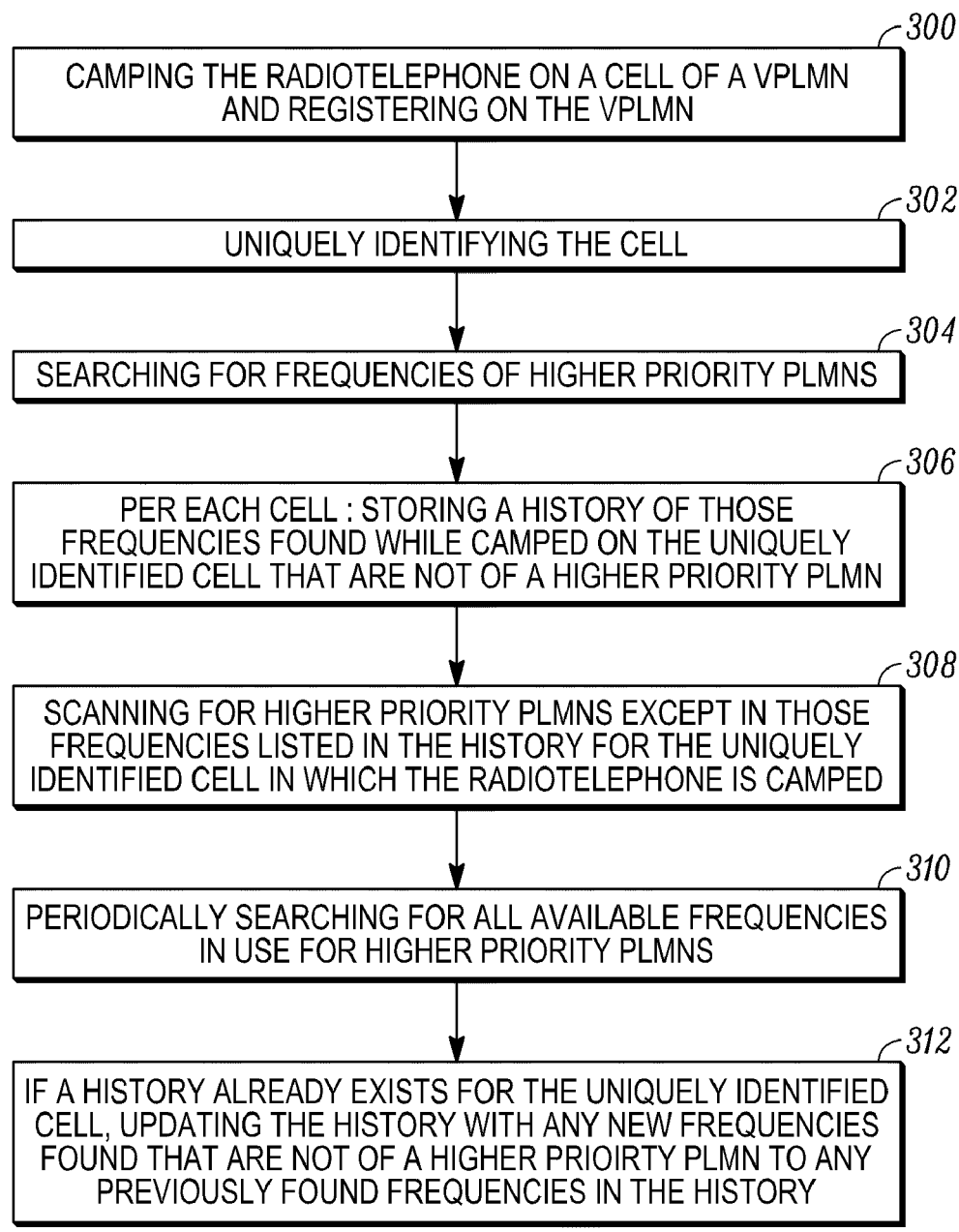
FIG. 3 illustrates a flow chart of method of operation of a mobile unit, in accordance with the present invention.

The method of the present invention can be further understood with reference to FIG. 3. The method provides for a radiotelephone to search for radio access technology communication networks. Each communication network includes a plurality of cells for providing radiotelephone service to a radiotelephone within a corresponding geographic area. Each cell includes paging and voice communication and has a radio communication coverage area established by fixed site base stations, which operate to send messages to radiotelephones and receive messages therefrom.

In a first step 300, the mobile radiotelephone registers and camps on a local PLMN (typically the best available network) that has service in one or more radio access technologies in which the radiotelephone is capable. The radiotelephone also uniquely identifies 302 the cell it is camped on. It may be that the radiotelephone is camped on the highest priority PLMN (e.g. home) available to it. However, for the present invention, the radiotelephone is camped on a Visited PLMN that is not the highest priority PLMN available to it. This calls for the radiotelephone to begin searching for a higher priority PLMN, and preferably its home or home-equivalent network. While on the VPLMN, the radiotelephone begins its normal reception and response or acknowledgement to messages and communications. However, the mobile radiotelephone is now required to periodically scan for the home or higher priority PLMN.

A next step 304 includes searching for public land mobile networks with a higher priority than the visited public land mobile network that the radiotelephone is camped on.

A novel aspect of the present invention is storing 306 a history of those frequencies found that are not of the home or higher priority public land mobile network. Similarly, if a history already exists for the camped cell, then the radiotelephone adds any newly found frequencies that are not of the home or higher priority PLMN to any previously found frequencies of the history. The radiotelephone would save the history in storage, which can be a SIM, USIM, or a memory, such as a non-volatile memory, for example. The history would be associated with the uniquely identified cell from step 302, such that the radiotelephone would no longer need to scan on a particular frequency when camped on the uniquely identified cell since it had previously determined that this frequency is only used by an undesired PLMN. Preferably, the radiotelephone stores an individual history of those frequencies found that are not of the home or higher priority public land mobile network for each of a plurality of cells of the VPLMN.

Thereafter, when camped on the identified cell, the radiotelephone would begin scanning 308 for frequencies of the home or higher priority public land mobile networks except for those frequencies listed in the history for the uniquely identified cell in which the radiotelephone is camped. This would save searching time and the associated battery drain since it is no longer necessary for the mobile unit to waste power scanning for all possible radio access technologies and all possible frequencies.

In a preferred embodiment, the method includes further steps of periodically searching 310, but at a very slow rate so as not to use much battery power, for all available radio access technologies and frequencies in use for the home or higher priority public land mobile networks, and updating 312 the history with any new frequencies found that are not of the home or higher priority public land mobile network. This is desired for those cases where the PLMN changes its radio access technologies or frequencies after the radiotelephone has stored a history. This is a failsafe technique to ensure that the radiotelephone keeps up to date information in accordance with the requirements of the 3GPP standard. Alternatively, the history in the storing step can be started anew each time the radiotelephone is powered on or after a certain amount of time elapses.

The present invention provides particular advantage for service providers that are looking forward to the availability of mobile stations capable of selecting the best available network type among different radio access technology networks. These features will provide a way for operators to use these same mobile stations while minimizing the impact on their networks.

In addition, it should be recognized that the method of the present invention can also be applied to scanning for more than one radio access technology, using a multimode radiotelephone capable of camping on several different radio technology systems.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for a radiotelephone to search for higher priority public land mobile networks comprising:
    camping the radiotelephone on a cell of a visited public land mobile network and registering on the visited public land mobile network;
    uniquely identifying the cell;
    searching for public land mobile networks with a higher priority than the visited public land mobile network while registered on the visited public land mobile network and camped on the uniquely identified cell;
    storing a history of those frequencies found during the searching step, while camped on the uniquely identified cell, that are not of a higher priority public land mobile network, the history being associated with the uniquely identified cell;
    periodically searching, at a slow rate so as not to consume much battery power, for higher priority public land mobile networks in all radio access technologies and frequencies supported by the radiotelephone; and
    if a history already exists for the uniquely identified cell, then updating the history with any new frequencies found that are not of a higher priority public land mobile network to any previously found frequencies in the history.

2. The method of claim 1, further comprising:
    scanning for higher priority public land mobile networks in frequencies other than those frequencies listed in the history for the uniquely identified cell in which the radiotelephone is camped while it is registered.

3. The method of claim 1, wherein the storing step includes storing public land mobile network identifiers(PLMN IDs) associated with each absolute radio frequency channel number(ARFCN), that was found to be not a home or higher priority PLMN, in the seaching step.

4. The method of claim 1, wherein the storing step includes storing an individual history of those frequencies found that are not of a higher priority public land mobile network for each of a plurality of cells of the visited public land mobile network.

5. The method of claim 1, wherein the storing step includes adding any newly found frequencies that are not of a higher priority public land mobile network to any previously found frequencies of the history.

6. The method of claim 1, wherein the history in the storing step is started anew at least one of the group of: each time the radiotelephone is power on and after a timeout period.

7. The method of claim 1, further comprising:
    giving a list of public land mobile networks to the radiotelephone; and
    erasing the history if there is a change in a stored preferred public land mobile network list.

8. A method for a radiotelephone to search for higher priority public land mobile networks comprising:
    camping the radiotelephone on a cell of a visited public land mobile network and registering on the visited public land mobile network;
    giving a list of public land mobile networks to the radiotelephone;
    uniquely identifying the cell;
    searching for public land mobile networks with a higher priority than the visited public land mobile network while registered on the visited public land mobile network and camped on the uniquely identified cell;
    storing a history of those frequencies found while camped on the uniquely identified cell that are not of a higher priority public land mobile network for each of a plurality of cells of the visited public land mobile network, the history being associated with each uniquely identified cell;
    periodically scanning for higher priority public land mobile networks except in those frequencies listed in the history for the uniquely identified cell in which the radiotelephone is camped while it is registered;
    periodically searching, at a slow rate so as not to consume much battery power, for higher priority public land mobile networks in all radio access technologies and frequencies supported by the radiotelephone;
    if a history already exists for the uniquely identified cell, then updating the history with any new frequencies found that are not of a higher priority public mobile network to any previously found frequencies in the history.

9. The method of claim 8, wherein the storing step includes storing public land mobile network identifiers(PLMN IDs) associated with each absolute radio frequency channel number(ARFCN) that was found to be not a home or higher priority PLMN, in the searching step.

10. The method of claim 8, wherein after the scanning step further comprising:
    adding any newly found frequencies that are not of a higher priority public land mobile network to any previously found frequencies of the history.

11. The method of claim 8, wherein the history in the storing step is started anew at least one of the group of: each time the radiotelephone is powered on and after a timeout period.

12. The method of claim 8, further comprising:
    erasing the history when there is a change in a stored preferred public land mobile network list.

13. The method of claim 8, wherein the storing step includes storing the history in one or more of a non-volatile memory of the radiotelephone and a subscriber identity module associated with the radiotelephone.

14. A method for a radiotelephone to search for higher priority public land mobile networks comprising:
    camping the radiotelephone on a cell of a visited public land mobile network and registering on the visited public land mobile network;
    giving a list of public land mobile networks to the radiotelephone;
    uniquely identifying the cell;
    searching for public land mobile networks with a higher priority than the visited public land mobile network while registered on the visited public land mobile network and camped on the uniquely identified cell;

storing an individual history of those frequencies found during the searching step while camped on the uniquely identified cell that are not of a higher priority public land mobile network for each of a plurality of uniquely identified cells of the visited public land mobile network;

periodically scanning for higher priority public land mobile networks except in those frequencies listed in the history for the uniquely identified cell in which the radiotelephone is camped while it is registered; and periodically searching, at a slow rate so as not to consume much battery power, for higher priority public land mobile networks in all radio access technologies and frequencies supported by the radiotelephone;

if a history already exists for the uniquely identified cell, then adding any newly found frequencies that are not of a higher priority public land mobile network to any previously found frequencies of the history to update the history previously found frequencies with any new frequencies found that are not of a higher priority public land mobile network.

15. The method of claim 14, wherein the history in the storing step is started anew at least one of the group of: each time the radiotelephone is powered on and after a timeout period.

16. The method of claim 14, further comprising:
erasing the history when there is a change in a stored preferred public land mobile network list.

17. The method of claim 14, wherein the storing step includes storing public land mobile network identifiers (PLMN IDs) associated with each absolute radio frequency channel number (ARFCN) that was found to be not a home or higher priority PLMN, in the searching step.

* * * * *